(12) United States Patent
Koketsu et al.

(10) Patent No.: US 10,232,735 B2
(45) Date of Patent: Mar. 19, 2019

(54) CONTROL DEVICE FOR POWER SUPPLY SYSTEM

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Kaoru Koketsu, Kariya (JP); Yuichi Handa, Kariya (JP); Seiji Iyasu, Kariya (JP); Takashi Nozawa, Toyota (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 271 days.

(21) Appl. No.: 15/292,905

(22) Filed: Oct. 13, 2016

(65) Prior Publication Data
US 2017/0113567 A1   Apr. 27, 2017

(30) Foreign Application Priority Data

Oct. 22, 2015  (JP) ................................ 2015-207990
Jul. 25, 2016  (JP) ................................ 2016-145724

(51) Int. Cl.
*B60L 11/00*   (2006.01)
*B60L 15/00*   (2006.01)
(Continued)

(52) U.S. Cl.
CPC ............. *B60L 15/007* (2013.01); *B60L 8/003* (2013.01); *B60L 11/08* (2013.01); *B60L 11/1868* (2013.01); *H02J 1/10* (2013.01); *H02J 7/34* (2013.01); *H02M 1/36* (2013.01); *B60L 2210/10* (2013.01); *B60L 2210/30* (2013.01); *B60L 2220/42* (2013.01); *B60Y 2200/91* (2013.01); *B60Y 2200/92* (2013.01); *B60Y 2400/112* (2013.01); *H02J 7/345* (2013.01);
(Continued)

(58) Field of Classification Search
CPC .. B60L 15/00; B60L 8/00; B60L 11/00; H02J 1/00; H02J 7/00; H02M 1/00
USPC .......................................................... 307/52
See application file for complete search history.

(56) References Cited

U.S. PATENT DOCUMENTS

2015/0183325 A1    7/2015  Mitsutani

FOREIGN PATENT DOCUMENTS

| JP | 2007-209114 A |   | 8/2007  |
| JP | 2007209114 A  | * | 8/2007  |
| JP | 2008253064 A  | * | 10/2008 |

* cited by examiner

*Primary Examiner* — Fritz M Fleming
*Assistant Examiner* — Joseph N Inge
(74) *Attorney, Agent, or Firm* — Oliff PLC

(57) ABSTRACT

A control device for a power supply system includes a pre-charge unit, the power supply system having a main electric storage device, a smooth capacitor, a step-up circuit, an open-close switch, a voltage source and a regulation element. The regulation element regulates a current flowing from the smooth capacitor toward the open-close switch. The voltage source is connected to a connection portion between the open-close switch and the step-up circuit, and outputs an output voltage higher than a voltage of the main electric storage device before the open-close switch is shifted from a disconnection state to a connection state. The pre-charge unit executes a pre-charge of the smooth capacitor by supplying electric power from the voltage source to the smooth capacitor before the open-close switch is shifted from the disconnection state to the connection state.

13 Claims, 7 Drawing Sheets

(51) Int. Cl.
  *B60L 11/08* (2006.01)
  *B60L 8/00* (2006.01)
  *B60L 11/18* (2006.01)
  *H02M 1/36* (2007.01)
  *H02J 1/10* (2006.01)
  *H02J 7/34* (2006.01)
  *H02M 3/158* (2006.01)

(52) U.S. Cl.
  CPC ............ *H02M 3/158* (2013.01); *Y02T 10/645* (2013.01); *Y02T 10/646* (2013.01); *Y02T 10/70* (2013.01); *Y02T 10/7005* (2013.01); *Y02T 10/7066* (2013.01); *Y02T 10/7077* (2013.01); *Y02T 10/7083* (2013.01); *Y02T 10/7216* (2013.01); *Y02T 10/7241* (2013.01)

CONTROL DEVICE FOR POWER SUPPLY SYSTEM

CROSS REFERENCE TO RELATED APPLICATION

This application is based on Japanese Patent Applications No. 2015-207990 filed on Oct. 22, 2015 and No. 2016-145724 filed on Jul. 25, 2016, the disclosures of which are incorporated herein by reference.

TECHNICAL FIELD

The present disclosure relates to a control device for a power supply system with an open-close switch.

BACKGROUND

For example, a hybrid vehicle loaded with a traction motor has an inverter connected to the motor, a main battery connected to the inverter, a system main relay (SMR) electrically connecting or disconnecting the inverter and the main battery, and a capacitor connected between direct current (DC) voltage terminals of the inverter. Generally, the above hybrid vehicle has a parallel circuit of a pre-charge relay, to which a pre-charge resistor for limiting inrush current is connected in series, and an SMR, to which the pre-charge resistor is not connected. In an initiation of the vehicle, the SMR is turned on after the pre-charge relay is turned on to pre-charge the capacitor. As such, the SMR is restricted from being damaged by large current.

Similarly to a vehicle only having an engine as a driving source, the hybrid vehicle is loaded with an auxiliary machine that receives electric power from an auxiliary battery and that outputs voltage lower than the main battery. In such a hybrid vehicle loaded with the auxiliary battery, a bidirectional DC to DC (DC-DC) converter or a DC-DC converter converting low voltage into high voltage is disposed between the main battery and the auxiliary battery. When such a DC-DC converter is disposed and the capacitor is pre-charged by the DC-DC converter, the pre-charge relay may be omitted. In this case, when the target voltage of the pre-charge is set to be equal to the voltage of the main battery and the SMR is turned on after the pre-charge is finished, the SMR is restricted from being damaged. However, depending on a detection error of a voltage sensor, which detects voltage, and depending on accuracy of output voltage of the DC-DC converter, there is a possibility that the voltage of the capacitor after the pre-charge is different from the voltage of the main battery and large current flows when the SMR is turned on. In such a case, there is difference between voltage of the capacitor right before the SMR is turned on and voltage of the capacitor right after the SMR is turned on.

A control device for a power supply system disclosed in JP 2007-209114 A detects a prior voltage and a subsequent voltage of the capacitor, the prior voltage being a voltage of the capacitor after the pre-charge is finished and right before the SMR is tuned on, and the subsequent voltage being a voltage of the capacitor right after the SMR is turned on. The control device records difference between the prior voltage and the subsequent voltage of the capacitor as a correction value. The control device corrects a target voltage for a next pre-charge using the recorded correction value and controls the difference between the voltage of the main battery and the voltage of the capacitor after the pre-charge. Furthermore, the control device restricts large current from flowing in the SMR.

SUMMARY

In JP 2007-209114 A, since the control device needs to record the correction value until the next pre-charge, a memory circuit for recording the correction value needs to be added to the control device. Furthermore, when the detection error varies depending on usage environment such as a temperature, there is a possibility that it is difficult to accurately correct the target voltage even when the correction is executed based on the updated correction value.

It is an object of the present disclosure to provide a control device for a power supply system capable of restricting an open-close switch from being damaged by employing a general circuit and by executing a simple control.

According to an aspect of the present disclosure, a control device for a power supply system includes a pre-charge unit, the power supply system having a main electric storage device, a smooth capacitor, a step-up circuit, an open-close switch, a voltage source and a regulation element.

The step-up circuit includes the smooth capacitor. The step-up circuit increases a voltage on a side of the main electric storage device and outputs the voltage being increased toward a side of the smooth capacitor. The open-close switch electrically connects or disconnects between the main electric storage device and the step-up circuit.

The voltage source is connected to a connection portion between the open-close switch and the step-up circuit. The voltage source outputs an output voltage higher than a voltage of the main electric storage device before the open-close switch is shifted from a disconnection state to a connection state. The regulation element does not regulate a current flowing from the open-close switch toward the smooth capacitor, and regulates a current flowing from the smooth capacitor toward the open-close switch.

The pre-charge unit executes a pre-charge of the smooth capacitor by supplying electric power from the voltage source to the smooth capacitor before the open-close switch is shifted from the disconnection state to the connection state.

Accordingly, both large current flowing from the main electric storage device to the smooth capacitor and large current flowing from the smooth capacitor to the main electric storage device are restricted, and the open-close switch is restricted from being damaged by executing a simple control.

BRIEF DESCRIPTION OF THE DRAWINGS

The above and other objects, features and advantages of the present disclosure will become more apparent from the following detailed description made with reference to the accompanying drawings, in which like parts are designated by like reference numbers and in which.

DETAILED DESCRIPTION

Hereinafter, an embodiment of the present disclosure will be described with reference to the drawings. A power supply system according to the present embodiment is, for example, a power supply system that is mounted to a vehicle loaded with a traction motor such as a hybrid vehicle and an electric vehicle.

Figure 1:
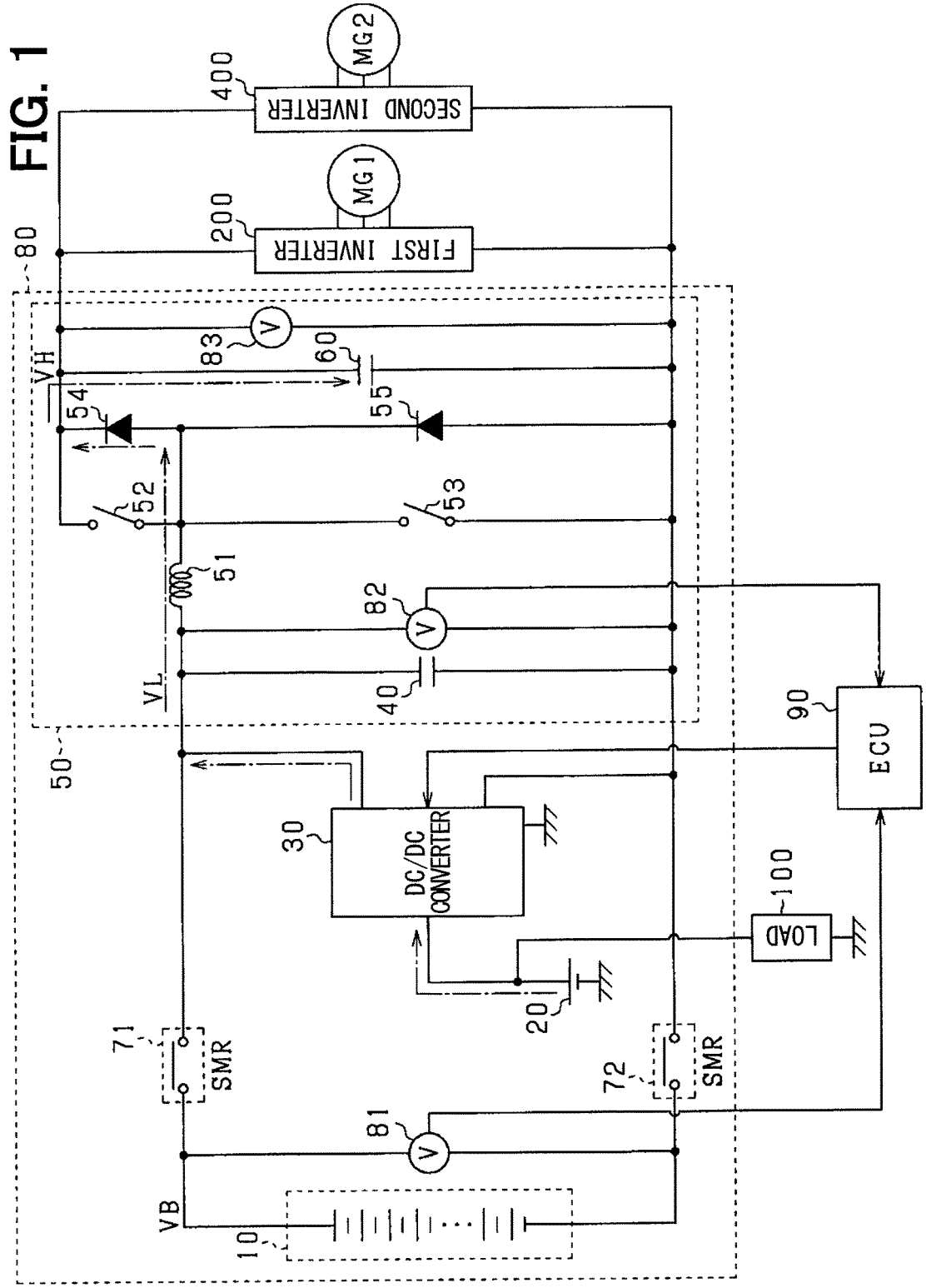
FIG. 1 is a diagram illustrating a power supply system according to the present embodiment.

The power supply system according to the present embodiment will be described with reference to FIG. 1. A power supply system 80 of the present embodiment includes a main battery 10, an auxiliary battery 20, a DC-DC converter 30, a step-up circuit 50, SMRs 71, 72, and voltage sensors 81, 82, 83. The power supply system 80 is connected to a motor generator 1 (MG1) through a first inverter 200 and is connected to a MG2 through a second inverter 400.

In the power supply system 80, the main battery 10 is connected to the step-up circuit 50 through the SMRs 71 and 72. The first inverter 200 and the second inverter 400 are respectively connected in parallel with a smooth capacitor 60 that is disposed at an output side of the step-up circuit 50. The DC-DC converter 30 is connected between the auxiliary battery 20 and connection portions of the SMRs 71, 72 and the step-up circuit 50. The DC-DC converter 30 is connected in parallel with a filter capacitor 40 that is disposed at an input side of the step-up circuit 50.

The main battery 10 is a high-voltage assembled battery including battery cells connected in series with each other. For example, rated output voltage of the main battery 10 is 200V to 300V. For example, lithium ion battery and nickel-hydrogen battery may be employed as the main battery 10. Mainly, the main battery 10 supplies and receives electric power with the MG1 and MG2 through the first inverter 200 and the second inverter 400. The main battery 10 corresponds to a main electric storage device.

The auxiliary battery 20 is a low-voltage battery having rated output voltage lower than the main battery 10. For example, the auxiliary battery 20 is lead battery. The auxiliary battery 20 is connected to a load 100 that is mounted to the vehicle. Mainly, the auxiliary battery 20 supplies electric power to the load 100. The load 100 is an electric equipment mounted to the vehicle. For example, the load 100 is an ECU, a headlight, an audio, an air-conditioning unit and a power window. The auxiliary battery 20 corresponds to an auxiliary electric storage device.

The DC-DC converter 30 is a circuit that converts the voltage of the electric power stored in the auxiliary battery 20 into a predetermined voltage and that outputs the predetermined voltage. In details, the DC-DC converter 30 is a bidirectional converter. The DC-DC converter 30 steps up the voltage of the electric power stored in the auxiliary battery 20 and supplies the stepped up voltage to the smooth capacitor 60 and the main battery 10. Also, the DC-DC converter 30 steps down the voltage of the electric power stored in the smooth capacitor 60 and the main battery 10 and supplies the stepped down voltage to the auxiliary battery 20. Conversely, the DC-DC converter 30 may be a unidirectional converter that steps up the voltage of the electric power stored in the auxiliary battery 20 and that supplies the stepped up voltage to the smooth capacitor 60 and the main battery 10.

The step-up circuit 50 steps up (i.e., increases) the voltage of the electric power stored in the main battery 10 and the output voltage of the DC-DC converter 30 to a predetermined voltage and supplies the predetermined voltage to the first inverter 200 and the second inverter 400. The step-up circuit 50 of the present embodiment is a step-up chopper circuit and includes the filter capacitor 40, a coil 51, switching elements 52, 53, diodes 54, 55 and the smooth capacitor 60. The switching elements 52 and 53 are, for example, insulated gate bipolar transistor (IGBT). The diodes 54 and 55 are connected in inverse-parallel with the switching elements 52 and 53. The diode 54 corresponds to a regulation element.

The filter capacitor 40 is a capacitor stabilizing an input voltage of the step-up circuit 50. The smooth capacitor 60 is a capacitor smoothing direct current (DC) voltage of the first inverter 200 and the second inverter 400. The voltage smoothed by the smooth capacitor 60 is inputted into the first inverter 200, the second inverter 400 and a bridge circuit of the step-up circuit 50. Generally, a capacity of the smooth capacitor 60 is larger than a capacity of the filter capacitor 40 and is about several times of the capacity of the filter capacitor 40.

The SMRs 71 and 72 are open-close switches that electrically connect or disconnect the main battery 10 and the step-up circuit 50. The SMR 71 and 72 are relays that close their contact points when excitation current passes through coils. In the present embodiment, each state where the contact point of the SMR 71 and the SMR 72 is closed is referred to as "on-state" and each state where the contact of the SMR 71 and the SMR 72 is opened is referred to as "off-state". When the SMRs 71 and 72 are in on-state, the main battery 10 and the step-up circuit 50 are electrically connected. When the SMRs 71 and 72 are in off-state, the main battery 10 and the step-up circuit 50 are electrically disconnected. The SMR 71 is disposed between a positive electrode of the main battery 10 and a coil 51 of the step-up circuit 50. The SMR 72 is disposed between a negative electrode of the main battery 10 and the step-up circuit 50.

The voltage sensor 81 is connected in parallel with the main battery 10 and detects voltage VB of the main battery 10. The voltage sensor 82 is connected in parallel with the filter capacitor 40 and detects voltage VL between terminals of the filter capacitor 40. The ECU 90 receives detection voltages detected by the voltage sensor 81 and the voltage sensor 82. The voltage sensor 83 is connected in parallel with the smooth capacitor 60 and detects voltage VH between terminals of the smooth capacitor 60.

The ECU 90 cannot receive the voltage VH that is detected by the voltage sensor 83 at the high-voltage side of the step-up circuit 50, unless through communication. During the pre-charge, the step-up circuit 50 does not operate, and the voltage VL between the terminals of the filter capacitor 40 is substantially equal to the voltage VH between the terminals of the smooth capacitor 60. Therefore, during the pre-charge, the voltage VL is detected as the voltage VH and the ECU 90 employs the voltage VL detected by the voltage sensor 82 as the voltage VH. The ECU 90 may receive the voltage VH detected by the voltage sensor 83 through the communication and may employ the voltage VH detected by the voltage sensor 83.

Figure 2:
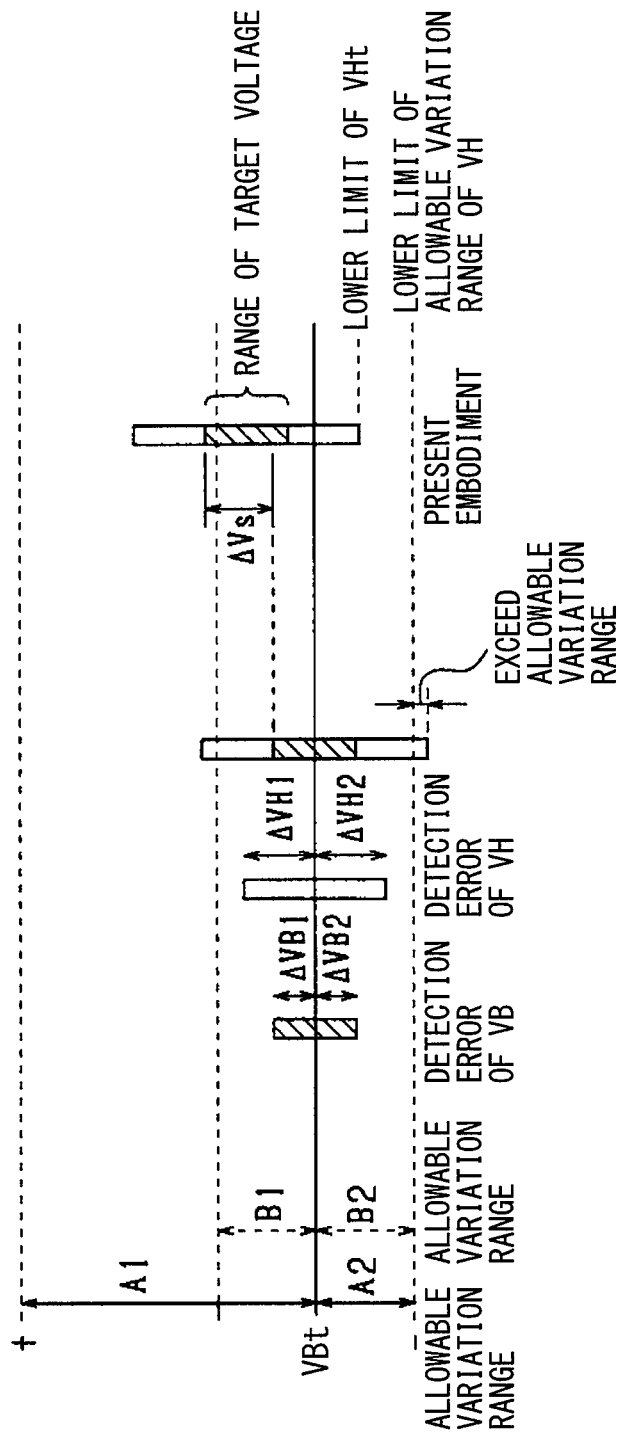
FIG. 2 is a diagram illustrating relations between detection error of voltage, allowable variation and target voltage.

For security reasons of user, the voltage VB of the main battery 10 needs to be detected relatively accurately. On the other hand, since the voltage VL and the voltage VH are employed for controlling the DC-DC converter 30, the first inverter 200 and the second inverter 400, the voltage VL and the voltage VH do not have to be detected as accurately as the voltage VB. Therefore, as shown in FIG. 2, each of the voltage sensors 82 and 83 is a detection circuit having detection error larger than the voltage sensor 81. Within a detection range assumed for voltage of detection object, the detection error of each voltage sensor 81, 82, and 83 is relatively small. Outside of the assumed detection range, the detection error of each voltage sensor 81, 82, 83 is relatively large.

The first inverter 200 and the second inverter 400 are three-phase electric power conversion circuits including six switching elements. The first inverter 200 and the second inverter 400 convert DC electric power supplied through the smooth capacitor 60 into AC electric power, and supply the AC electric power to the MG1 and MG2. Also, the first inverter 200 and the second inverter 400 convert AC electric power supplied from the MG1 and MG2 into DC electric power and supply the DC electric power to the smooth capacitor 60.

The MG1 and the MG2 of the present embodiment are three-phase motor generators. The MG1 is a motor generator mainly functioning as power generator. The MG2 is a motor generator mainly functioning as electric motor and functioning as traction driving source of vehicle.

The ECU 90 (corresponding to a control device for a power supply system) mainly includes a microcomputer having CPU, ROM, RAM, I/O and memory device. The ECU 90 transmits on/off command to the SMRs 71 and 72 and transmits operation command to the DC-DC converter 30 and the step-up circuit 50. In details, ROM is a non-transitory tangible storage medium such as a semiconductor memory, and the ROM stores programs achieving functions for controlling the power supply system 80. The CPU executes the programs stored in the ROM to achieve the functions to control the power supply system 80. The ECU 90 achieves functions of a pre-charge unit, a voltage set unit, a discharge unit and a charge unit and has various types of map. Hereinafter, functions of the ECU 90 will be described.

First, relations between operation states of the SMRs 71, 72 and positions of a starter switch will be described. The starter switch includes an ignition switch and a push-type start switch. The starter switch has, for example, off position, ACC position, on position and start position. Positions of the starter switch are shifted in the order of the off position, the ACC position, the on position and the start position. The starter switch is automatically returned from the start position to the on position. When the ECU 90 is not connected to the power source, that is, when the position of the starter switch is the off position, the ECU 90 turns off the SMRs 71 and 72. When the ECU 90 is connected to the power source, that is, when the position of the starter switch is shifted from the off position to the start position through the ACC position and the on position, first, the ECU 90 pre-charges the smooth capacitor 60 by the pre-charge unit. When the voltage VH of the smooth capacitor 60 reaches the target voltage and the pre-charge is finished, the ECU 90 shifts the SMRs 71, 72 from the off-state to the on-state and shifts the SMRs 71, 72 from pre-charge mode to normal mode.

In details, when the position of the starter switch is shifted to the start position, before the SMRs 71 and 72 are shifted from the off-state to the on-state, the pre-charge unit allows the DC-DC converter 30 to execute step-up operation while leaving the SMRs 71 and 72 in the off-state. The pre-charge unit steps up the voltage of the auxiliary battery 20, supplies the stepped up voltage to the smooth capacitor 60, and pre-charges the smooth capacitor 60 to a target voltage, which is described later. Accordingly, as shown by a dashed-dotted arrow in FIG. 1, current flows from the auxiliary battery 20 to the smooth capacitor 60 through the DC-DC converter 30, the coil 51 of the step-up circuit 50 and the diode 54. In this case, the pre-charge unit controls the operation of the DC-DC converter 30 so that the voltage of the smooth capacitor 60 gently increases to restrict occurrence of inrush current. During the pre-charge, the step-up circuit 50 is not operated.

The voltage set unit sets the target voltage of the pre-charge of the smooth capacitor 60 based on the detection value of the voltage VB of the main battery 10. If a deviation $\Delta V$ between the voltage VB of the main battery 10 and the voltage VH after the pre-charge is not within an allowable variation range, there is a possibility that, large current caused by turning on the SMRs 71, 72 flows in the SMR 71 and the contact point of the SMR 71 is damaged. Especially, when the above state is repeated, the contact point of the SMR 71 is damaged. The allowable variation range is set so that when the deviation $\Delta V$ is set within the allowable variation range, the current that is caused by shifting the SMRs 71 and 72 from the off-state to the on-state and that flows in the SMR 71 is small enough not to damage the contact point of the SMR 71.

Accordingly, it is desirable to sufficiently reduce the deviation $\Delta V$ between the voltage VB and the voltage VH after the pre-charge. However, the voltage VB and the voltage VH have detection errors. As shown in FIG. 2, the maximum value of positive detection error of the voltage VB is referred to as $\Delta VB1$, the maximum value of negative detection error of the voltage VB is referred to as $\Delta VB2$, and an actual value of the voltage VB is referred to as VBt. The detection voltage VBd of the voltage VB is within a range from $(VBt-\Delta VB2)$ to $(VBt+\Delta VB1)$. When the detection voltage VBd is set as the target voltage of the pre-charge, the target voltage is within a range from $(VBt-\Delta VB2)$ to $(VBt+\Delta VB1)$.

The maximum value of positive detection error of the voltage VH (i.e., the voltage VL) is referred to as $\Delta VH1$ and the maximum value of negative detection error of the voltage VH is referred to as $\Delta VH2$. When the detection voltage VBt is set as the target voltage of the pre-charge, the actual value VHt of the voltage VH is within a range from $(VBt-\Delta VB2-\Delta VH2)$ to $(VBt+\Delta VB1+\Delta VH1)$. The deviation $\Delta V$ between the actual value VHt of the voltage VH and the actual value VBt of the voltage VB is within the range from $-(\Delta VB2+\Delta VH2)$ to $(\Delta VB1+\Delta VH1)$. The positive deviation $\Delta V$ with respective to the actual value VBt corresponds a state where the voltage VH is higher than the voltage VB.

Positive and negative amplitudes of the allowable variation range considering the capacity of the smooth capacitor 60 and the capacity of the filter capacitor 40 are set as B1 and B2 with respect to the actual value VBt of the voltage VB. As shown in FIG. 2, in order to reduce $(\Delta VB1+\Delta VH1)$ and $(\Delta VB2+\Delta VH2)$ below B1 and B2, accurate detection circuit compared to the power supply system with the pre-charge relay needs to be provided. In order to restrict large current caused by turning on the SMRs 71 and 72 from flowing in the SMR 71, production cost to achieve the accurate detection circuit is increased.

When the SMRs 71 and 72 are turned on and the actual value VBt of the voltage VB is larger than the actual value VHt of the voltage VH, current flows from the main battery 10 to the filter capacitor 40 and the smooth capacitor 60. On the other hand, when the SMRs 71 and 72 are turned on and the actual value VBt of the voltage VB is smaller than the actual value VHt of the voltage VH, the current flows from the filter capacitor 40 to the main battery 10. In this case, the current flowing from the smooth capacitor 60 to the main battery 10 is regulated by the diode 54. The diode 54 operates as the regulation element that does not regulate the current flowing from the SMR 71 toward the smooth capacitor 60 and that regulates the current flowing from the smooth capacitor 60 toward the SMR 71.

The deviation $\Delta V$ in which the actual value VHt is larger than the actual value VBt may have larger value than the deviation $\Delta V$ in which the actual value VHt is smaller than the actual value VBt. As shown in FIG. 2, when the allowable variation in which the actual value VHt is larger than the actual value VBt is referred to as A1 and the allowable variation in which the actual value VHt is smaller than the actual value VBt is referred to as A2, A1 is larger than A2. In such a case, the allowable range of the actual value VHt after the pre-charge is from (VBt−A2) to (VBt+A1). When the actual value VHt after the pre-charge is within the above allowable range, the large current caused by turning on the SMRs 71, 72 is restricted from flowing in the SMR 71.

The voltage set unit sets the target voltage of the pre-charge to a value larger than the detection value of the voltage VB by a predetermined voltage $\Delta VS$. In this case, the target voltage is within a range from (VBt+$\Delta VS$−$\Delta VB2$) to (VBt+$\Delta VS$+$\Delta VB1$). The actual value VHt of the voltage VH is within a range from (VBt+$\Delta VS$−$\Delta VB2$−$\Delta VH2$) to (VBt+$\Delta VS$+$\Delta VB1$+$\Delta VH1$).

The voltage set unit sets the predetermined voltage $\Delta VS$ as follows. The voltage set unit sets the predetermined voltage $\Delta VS$ so that a lower limit of a value, which is obtained by adding the predetermined voltage $\Delta VS$ and the detection errors of the voltage VB and the voltage VH to the actual value VBt of the voltage VB, is higher than a lower limit of the allowable range of the voltage VH. The lower limit of the value, which is obtained by adding the predetermined voltage $\Delta VS$ and the detection errors of the voltage VB and the voltage VH to the actual value VBt of the voltage VB, is equal to a possible lower limit of the actual value VHt of the voltage VH after the pre-charge, i.e., (VBt+$\Delta VS$−$\Delta VB2$−$\Delta VH2$). On the other hand, the lower limit of the allowable range of the voltage VH is equal to a value obtained by adding the negative allowable variation A2 to the actual value VBt, i.e., (the actual value VBt−A2). The voltage set unit sets $\Delta VS$ so that (VBt+$\Delta VS$−$\Delta VB2$−$\Delta VH2$) is larger than (VBt−A2). That is, the voltage set unit sets $\Delta VS$ so that $\Delta VS$ is larger than ($\Delta VB2$+$\Delta VH2$−A2).

A possible higher limit of the actual value VHt of the voltage VH is equal to (VBt+$\Delta VS$+$\Delta VB1$+$\Delta VH1$) and the higher limit value of the allowable range of the voltage VH is equal to (VBt+A1). The voltage set unit sets $\Delta VS$ so that (VBt+A1) is larger than (VBt+$\Delta VS$+$\Delta VB1$+$\Delta VH1$). That is, the voltage set unit sets $\Delta VS$ so that $\Delta VS$ is smaller than (A1−$\Delta VB1$−$\Delta VH1$). Since A1 is larger than A2, as described above, generally, when the $\Delta VS$ is set so that the $\Delta VS$ is larger than ($\Delta VB2$+$\Delta VH2$−A2), $\Delta VS$ is smaller than (A1−$\Delta VB1$−$\Delta VH1$).

The voltage set unit employs prepared maps to calculate the detection error range from −$\Delta VB2$ to $\Delta VB1$, the detection error range from −$\Delta VH2$ to $\Delta VH1$ and the allowable variation range from −A2 to A1. For example, the ECU 90 has a voltage-error map and a voltage-allowance map as the prepared maps. The voltage-error map is a map showing the detection error $\Delta VB1$, $\Delta VB2$ of the voltage VB according to the voltage VB or the voltage VH and showing the detection error $\Delta VH1$, $\Delta VH2$ of the voltage VH according to the voltage VB or the voltage VH. The voltage-allowance map is a map showing the allowable variation A1, A2 according to the voltage VB or the voltage VH. The ECU 90 may employ the pre-set values of $\Delta VB2$, $\Delta VB1$, $\Delta VH2$, $\Delta VH1$, A2 and A1 without the predetermined maps.

As described above, the voltage sensors 81, 82 have different detection errors depending on whether the detection voltage is within the assumed range. Since the voltage VB is almost equal to the voltage VH, the voltage-error map may correspond to both of the voltage VB and the voltage VH. There is a possibility that the current caused by turning on the SMRs 71, 72 and flowing in the SMR 71 varies according to the voltage VB or the voltage VH. Therefore, the voltage-allowance map is also prepared. The voltage set unit employs the prepared maps to calculate the detection error range from −$\Delta VB2$ to $\Delta VB1$, the detection error range from −$\Delta VH2$ to $\Delta VH1$ and the allowable variation range from −A2 to A1. The voltage set unit may only calculate the detection error $\Delta VB2$, the detection error $\Delta VH2$ and the allowable variation A2.

The ECU 90 may have a temperature-allowance map or a temperature-error map, the temperature-allowance map showing the allowable variation according to the temperature at usage environment of the power supply system 80, and the temperature-error map showing the detection errors of the voltage VB and the voltage VH according to the temperature. Generally, proper temperature range for the main battery 10 is determined. When the main battery 10 is employed at a temperature within the proper temperature range, the value of the allowable variation A2 is relatively large and the detection error is relatively small. When the main battery 10 is employed at a temperature out of the proper temperature range, the allowable variation A2 is relatively small and the detection error is relatively large.

The voltage set unit may calculate the allowable variation range from −A2 to A1 based on the temperature-allowance map, and may calculate the detection error range from −VB2 to $\Delta VB1$ and the detection error range from −$\Delta VH2$ to $\Delta VH1$ based on the temperature-error map. The ECU 90 may have an allowance map showing the allowable variation according to the temperature and the voltage VB or showing the allowable variation according to the temperature and the voltage VH. The ECU 90 may have a detection error map showing the detection error according to the temperature and the voltage VB or showing the detection error according to the temperature and the voltage VH. The ECU 90 may calculate the allowable variation and the detection error from the above allowance map and the above error map. The temperature at the usage environment of the power supply system 80, especially, the temperature at the usage environment of the main battery 10 is detected by a non-illustrated temperature sensor.

The voltage set unit may calculate the allowable variation based on the capacity of the smooth capacitor 60. As the capacity of the smooth capacitor 60 increases, the amplitude of the allowable variation decreases. The capacity of the smooth capacitor 60 decreases with aged deterioration of the smooth capacitor 60. The voltage set unit may determine a degree of deterioration of the smooth capacitor 60 based on the total travel distance or the total travel time period of the vehicle. The voltage set unit may correct the capacity of the smooth capacitor 60 being mounted to the vehicle based on the degree of the deterioration and may calculate the allowable variation A2 based on the corrected capacity of the smooth capacitor 60. The voltage set unit may calculate the allowable variation based on the corrected capacity of the smooth capacitor 60 and the prepared maps.

The discharge unit discharges the electric power stored in the filter capacitor 40 while leaving the SMRs 71 and 72 in the off-state after the detection voltage VHd of the voltage VH is determined to reach the target voltage of the pre-charge, that is, after the pre-charge of the smooth capacitor 60 is determined to be finished. As such, the current caused by turning on the SMRs 71, 72 and flowing from the filter capacitor 40 to the SMR 71 is restricted. Accordingly, the amplitude of the positive allowable variation A1 is increased compared to the case in which the electric power stored in the filter capacitor 40 is not discharged.

Specifically, the discharge unit operates the DC-DC converter 30 to discharge electric charge of the filter capacitor 40. The discharge unit may operate the step-up circuit 50 to discharge the electric charge of the filter capacitor 40. As such, the voltage VL of the filter capacitor 40 is adjusted without changing the voltage VH of the smooth capacitor 60. When the voltage VL is adjusted, the voltage VL varies from the value almost equal to the voltage VL.

After the pre-charge of the smooth capacitor 60 is determined to be finished, the charge unit shifts the SMRs 71, 72 from the off-state to the on-state to achieve the normal mode in which the main battery 10 and the step-up circuit 50 are energized. In details, the charge unit shifts the SMRs 71, 72 from the off-state to the on-state after the detection voltage VHd of the voltage VL is determined to reach the target voltage set by the voltage set unit.

When the position of the starter switch is shifted from the on position to the off position, the ECU 90 turns off the SMR 71 first, and turns off the SMR 72 to disconnect the electric connections between the main battery 10 and the first inverter 200 and the second inverter 400. The voltage of each of the first inverter 200 and the second inverter 400 gradually converges to small voltage around 0V.

Next, a processing for executing the pre-charge will be described with reference to a flowchart of FIG. 3. This processing is executed by the ECU 90 when the position of the starter switch is shifted from the off position to the start position.

First, at S10, it is determined whether a pre-charge request is generated. A case in which the position of the starter switch is shifted to the start position but the pre-charge request is not generated means a case in which some abnormality occurs in the power supply system 80 or circumference. When the pre-charge request is not generated (S10: No), the processing waits without executing the pre-charge at S11.

On the other hand, when the pre-charge request is generated (S10: Yes), the detection voltage VBd of the voltage VB is obtained from the voltage sensor 81 at S12. At S13, the allowable variation range from −A2 to A1 is calculated based on the voltage-allowance map. At S14, the detection error range of the voltage VB from −ΔVB2 to ΔVB1 and the detection error range of the voltage VH from −ΔVH2 to ΔVH1 are calculated based on the voltage-error map.

At S15, the target voltage of the pre-charge is calculated from the detection voltage VBd of the voltage VB, the allowable variation A2, the detection error ΔVB1 and the detection error ΔVH2.

At S16, the target voltage of the pre-charge is set as the command voltage of the DC-DC converter 30, and the pre-charge of the smooth capacitor 60 is executed by operating the DC-DC converter 30.

At S17, it is determined whether the detection voltage VHd of the voltage VH reaches the target voltage of the pre-charge. When the detection voltage VHd of the voltage VH does not reach the target voltage (S17: No), the processing of S17 is repeated.

On the other hand, when the detection voltage VHd of the voltage VH reaches the target voltage (S17: Yes), at S18, the SMRs 71, 72 are shifted from the off-state to the on-state and pre-charge mode is shifted to the normal mode. Before the SMRs 71, 72 are turned on, it is preferable to discharge the electric charge of the filter capacitor 40 until the voltage VL of the filter capacitor 40 becomes equal to the target voltage that does not consider the predetermined voltage ΔVS. The processing is finished hereinabove.

According to the present embodiment described above, the following effects are achieved.

The target voltage is set to the value larger than the detection value of the voltage VB by the predetermined voltage ΔVS. The deviation between the actual value VBt of the voltage VB and the actual value VHt of the voltage VH is likely to be within the allowable variation range from −A2 to A1 both in a case where the higher detection error occurs in the voltage VH and a case where the lower detection error occurs in the voltage VH. The diode 54 is generally provided in the step-up circuit. The SMR 71 is restricted from being damaged by employing the circuit that is general for the power supply system 80 and by executing the simple control.

The predetermined voltage ΔVS is set so that the possible lower limit value of the actual value VHt of the voltage VH is larger than the lower limit of the allowable range of the voltage VH. As such, the deviation ΔV is certainly within the allowable variation range from −A2 to A1.

The voltage sensors 81, 82 have relatively small detection error within the assumed range of the detection voltage and have relatively large detection error out of the assumed range of the detection voltage. The detection error range from −ΔVB2 to ΔVB1 of the voltage VB and the detection error range from −ΔVH2 to ΔVH1 of the voltage VH are calculated based on the voltage-error map.

Even when the current flowing in the SMR 71 varies depending on the voltage VB or the voltage VH when the SMRs 71, 72 are shifted from the off-state to the on-state, the allowable variation range from −A2 to A1 is calculated properly based on the voltage-allowance map.

When the main battery 10 is employed at the temperature within the proper temperature range, the amplitude of the allowable variation A2 is relatively large. When the main battery 10 is employed at the temperature out of the proper temperature range, the amplitude of the allowable variation A2 is relatively small. The allowable variation range from −A2 to A1 is calculated based on the temperature-allowance map.

When the main battery 10 is employed at the temperature within the proper temperature range, the amplitude of the detection error is relatively small. When the main battery 10 is employed at the temperature out of the proper temperature range, the amplitude of the detection error is relatively large. The detection error range from −ΔVB2 to ΔVB1 and the detection error range from −ΔVH2 to ΔVH1 are calculated based on the temperature-error map.

The amplitude of the allowable variation A2 varies according to the capacity of the smooth capacitor 60. The allowable variation range from −A2 to A1 is calculated based on the capacity of the smooth capacitor 60.

When the SMRs 71, 72 are turned on, the discharge from the smooth capacitor 60 to the SMR 71 is regulated by the diode 54, but the discharge from the filter capacitor 40 to the SMR 71 is not regulated by the diode 54. However, generally, the capacity of the filter capacitor 40 is smaller than the capacity of the smooth capacitor 60. The positive allowable variation A1 is increased only by regulating the discharge from the smooth capacitor 60 compared to the case where the discharge from the smooth capacitor 60 is not regulated. When the electric power stored in the filter capacitor 40 is discharged after the pre-charge, the discharge from the filter capacitor 40 to the SMR 71 caused by turning on the SMRs 71, 72 is restricted. In this case, positive allowable variation A1 is further increased.

When the DC-DC converter 30 is operated, the voltage VL of the filter capacitor 40 is adjusted without adding another circuit.

When the step-up circuit 50 is operated, only the voltage VL of the filter capacitor 40 is adjusted without adding another circuit.

According to a first aspect of the present disclosure, a control device for a power supply system includes a pre-charge unit, the power supply system having a main electric storage device, a smooth capacitor, a step-up circuit, an open-close switch, a voltage source, and a regulation element.

The step-up circuit includes a smooth capacitor and increases voltage on a side of the main electric storage device and outputs the increased voltage toward a side of the smooth capacitor. The open-close switch electrically connects or disconnects the main electric storage device and the step-up circuit.

The voltage source is connected to a connection portion between the open-close switch and the step-up circuit. The voltage source outputs voltage higher than the voltage of the main electric storage device before the open-close switch is shifted from the disconnection state to the connection state. The regulation element does not regulate current flowing from the open-close switch toward the smooth capacitor and regulates current flowing from the smooth capacitor toward the open-close switch.

The pre-charge unit supplies electric power from the voltage source to the smooth capacitor to pre-charge the smooth capacitor before the open-close switch is shifted from the disconnection state to the connection state.

According to the first aspect of the present disclosure, when the open-close switch is shifted to disconnection state and the smooth capacitor is pre-charged, the electric power is supplied from the voltage source to the smooth capacitor through the regulation element. The voltage source outputs the voltage higher than the voltage of the main electric storage device before the open-close switch is shifted from the disconnection state to the connection state. By executing the pre-charge, the voltage of the smooth capacitor is increased to be higher than the voltage of the main electric storage device before the open-close switch is shifted from the disconnection state to the connection state.

Even when the voltage of the smooth capacitor is increased to be higher than the voltage of the main electric storage device before the open-close switch is shifted from the disconnection state to the connection state, the discharge from the smooth capacitor to the open-close switch is regulated by the regulation element. Accordingly, both large current flowing from the main electric storage device to the smooth capacitor and large current flowing from the smooth capacitor to the main electric storage device are restricted, and the open-close switch is restricted from being damaged by executing the simple control.

According to a second aspect of the present disclosure, a control device for a power supply system includes a pre-charge unit, a voltage set unit and an energization unit, the power supply system having a main electric storage device, an auxiliary electric storage device, a smooth capacitor, a step-up circuit, an open-close switch, and a DC-DC converter.

The step-up circuit includes a smooth capacitor and increases voltage on a side of the main electric storage device and outputs the increased voltage toward a side of the smooth capacitor. The step-up circuit includes a regulation element that does not regulate current flowing from the open-close switch toward the smooth capacitor and regulates current flowing from the smooth capacitor toward the open-close switch.

The open-close switch electrically connects or disconnects the main electric storage device and the step-up circuit. The DC-DC converter is connected between a connection portion of the open-close switch and the step-up circuit and the auxiliary electric storage device, and converts and outputs the voltage of the electric power stored in the auxiliary electric storage device.

The pre-charge unit supplies electric power from the DC-DC converter to the smooth capacitor to pre-charge the smooth capacitor before the open-close switch is shifted from the disconnection state to the connection state. The voltage set unit sets target voltage of the pre-charge of the smooth capacitor to a value larger by predetermined voltage than detection voltage of the main electric storage device. The energization unit shifts the open-close switch to the connection state after the detection voltage of the smooth capacitor is determined to reach the target voltage.

According to the second aspect of the present disclosure, when the open-close switch is in the disconnection state and the smooth capacitor is pre-charged, voltage of the electric power stored in the auxiliary electric storage device is converted by the DC-DC converter and the electric power is supplied from the DC-DC converter to the smooth capacitor through the step-up circuit. The target voltage of the pre-charge is set to the value larger than the detection voltage of the main electric storage device by the predetermined voltage. The open-close switch is shifted to the connection state after the detection voltage of the smooth capacitor is determined to reach the target voltage.

If deviation between the voltage of the main electric storage device and the voltage of the smooth capacitor after the pre-charge is within an allowable variation range, large current caused by shifting the open-close switch to the connection and flowing from the smooth capacitor or the main electric storage device to the open-close switch is restricted and the open-close switch is restricted from being damaged. However, it is difficult to set the deviation within the allowable variation range due to detection error of detection voltage of the main electric storage device and detection error of detection voltage of the smooth capacitor.

In order to set the deviation within the allowable variation range, the detection error needs to be sufficiently reduced. Compared to a case where a pre-charge relay, in which pre-charge resistance naturally adjusts voltage, is employed, in a case where voltage is adjusted based on detection voltage as target, voltage sensor detecting the voltage of the main electric storage device and voltage sensor detecting the voltage of the smooth capacitor need to have high accuracy. However, as the voltage sensor is accurate, cost of the voltage sensor increases.

If the target voltage is set to the value larger than the detection voltage of the main electric storage device by the predetermined voltage, in the case where the detection voltage is likely to be lower than the actual voltage, the actual voltage of the smooth capacitor is lower than the target voltage. Therefore, the above deviation is likely to be within the allowable variation range.

On the other hand, in the case where the detection voltage is likely to be higher than the actual voltage, the actual voltage of the smooth capacitor is higher than the target voltage. Therefore, the above deviation is likely to increase compared to the case where the detection voltage is lower than the actual voltage. However, the discharge from the smooth capacitor to the open-close switch is regulated by the regulation element. In this case, relatively large value is allowed for the variation in which the voltage of the smooth capacitor is higher than the voltage of the main electric storage device, compared to the variation in which the voltage of the smooth capacitor is lower than the voltage of the main electric storage device.

Since the target voltage is set to the value larger than the detection voltage of the main electric storage device by the predetermined voltage, the above deviation is likely to be within the allowable variation range both in the case where the voltage of the smooth capacitor is higher than the voltage of the main electric storage device and in the case where the voltage of the smooth capacitor is lower than the voltage of the main electric storage device. Further, the regulation element is generally provided with the step-up circuit. Accordingly, the open-close switch is restricted from being damaged by employing circuit general for the power supply system and by executing simple control.

Other Embodiment

In the above embodiment, as the voltage source that is connected to the connection portion between SMRs 71, 72 and the step-up circuit 50 and outputs the voltage higher than the voltage of the main battery 10 before the SMRs 71, 72 are shifted from the disconnection state to the connection state, the DC-DC converter 30 that steps up the voltage of the auxiliary battery 20 is employed. However, the voltage source may be modified.

Specifically, a power converter that steps up voltage supplied from a power source other than the auxiliary battery 20 may be employed as the voltage source.

Figure 4:
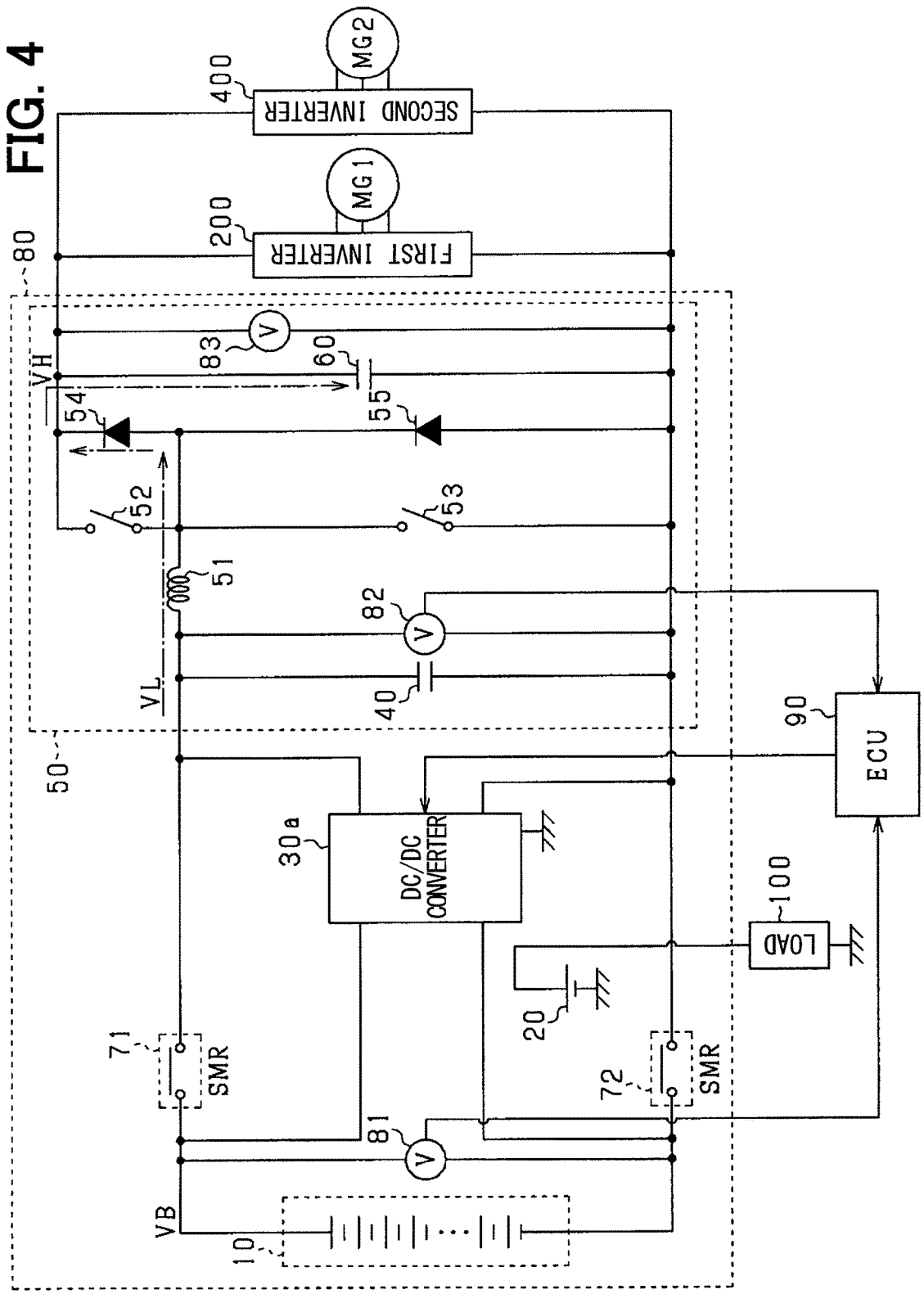
FIG. 4 is a diagram illustrating a power supply system according to a modification.

For example, as shown in FIG. 4, a DC-DC converter 30*a* that steps up the output voltage of the main battery 10 may be employed as the voltage source. An input terminal of the DC-DC converter 30*a* is connected to both terminals of the main battery 10 at places more adjacent to the main battery 10 than the SMRs 71, 72. An output terminal of the DC-DC converter 30*a* is connected to the filter capacitor 40 (i.e., the input terminal of the step-up circuit 50) at places more adjacent to the step-up circuit 50 than the SMRs 71, 72.

Figure 5:
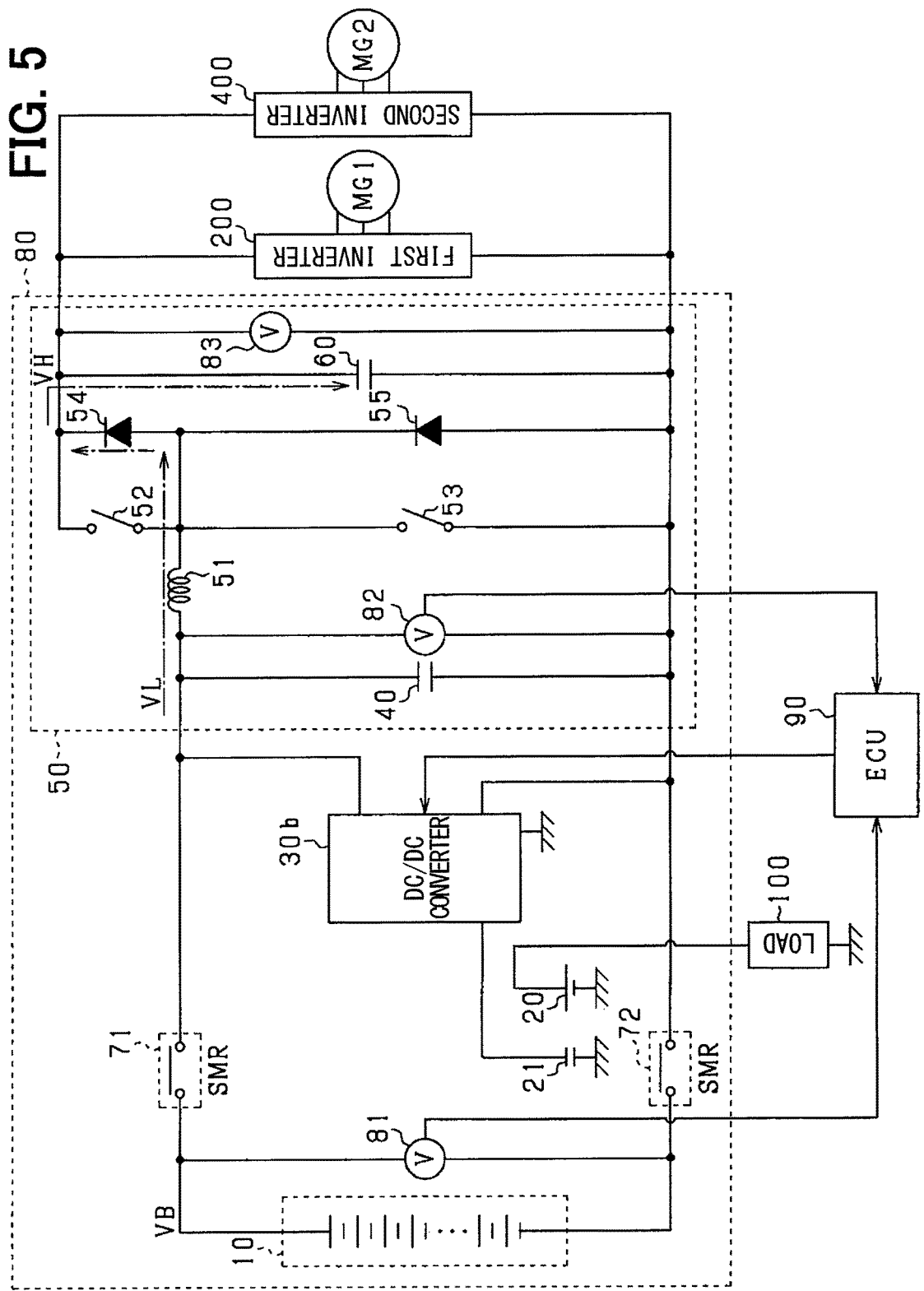
FIG. 5 is a diagram illustrating a power supply system according to a modification.

As shown in FIG. 5, a DC-DC converter 30*b* that steps up voltage of electric power supplied from a capacitor 21 to the voltage higher than the main battery 10 may be employed as the voltage source. An input terminal of the DC-DC converter 30*b* is connected to both terminals of the capacitor 21. An output terminal of the DC-DC converter 30*b* is connected to the filter capacitor 40 (i.e., the input terminal of the step-up circuit 50) at places more adjacent to the step-up circuit 50 than the SMRs 71, 72. The DC-DC converter 30*b* is a bidirectional DC-DC converter and charges the capacitor 21 by electric power stored in the main battery 10, the filter capacitor 40, and the smooth capacitor 60. The capacitor 21 may be a general capacitor, or may be an electric double layer capacitor.

Figure 6:
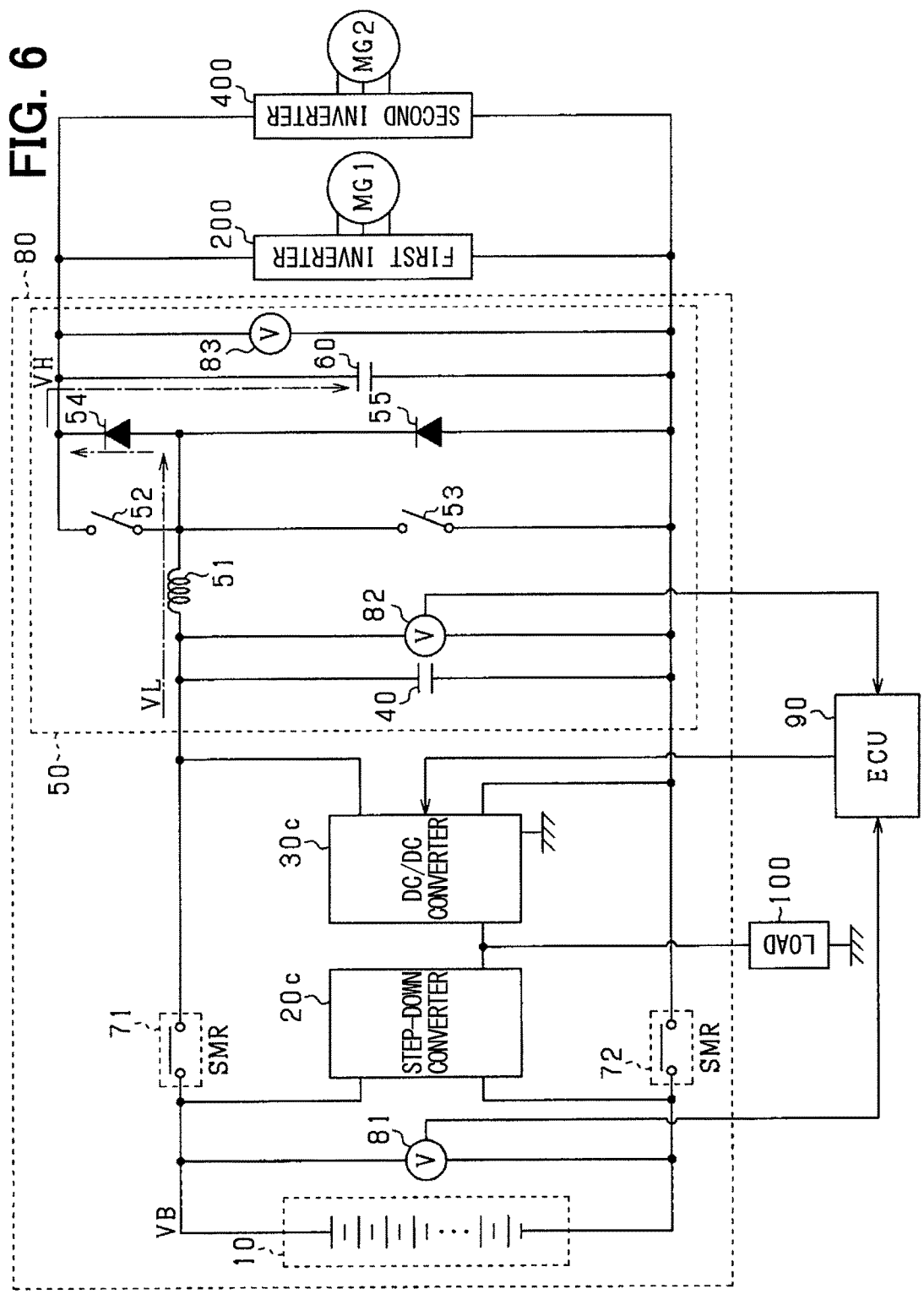
FIG. 6 is a diagram illustrating a power supply system according to a modification.

As shown in FIG. 6, the control device for the power supply system may be applied for a power supply system in which the auxiliary battery 20 is omitted and a step-down converter 20*c* is added, the step-down converter 20*c* stepping down (i.e., decreasing) the output voltage of the main battery 10. The step-down converter 20*c* is connected to the load mounted to the vehicle and supplies electric power to the load 100. In this structure, a DC-DC converter 30*c* that steps up the voltage of the electric power supplied from the step-down converter 20*c* as the power source to the voltage higher than the main battery 10 is employed as the voltage source.

Furthermore, a solar cell (i.e., a solar panel) disposed on a roof of the vehicle may be employed as the power source and a DC-DC converter that steps up the electric power supplied from the solar cell to the voltage higher than the main battery 10 may be employed as the voltage source.

An AC-DC converter that converts AC power supplied from AC power source and outputs DC voltage higher than the main battery 10 may be employed as the voltage source, instead of the DC-DC converter.

Figure 7:
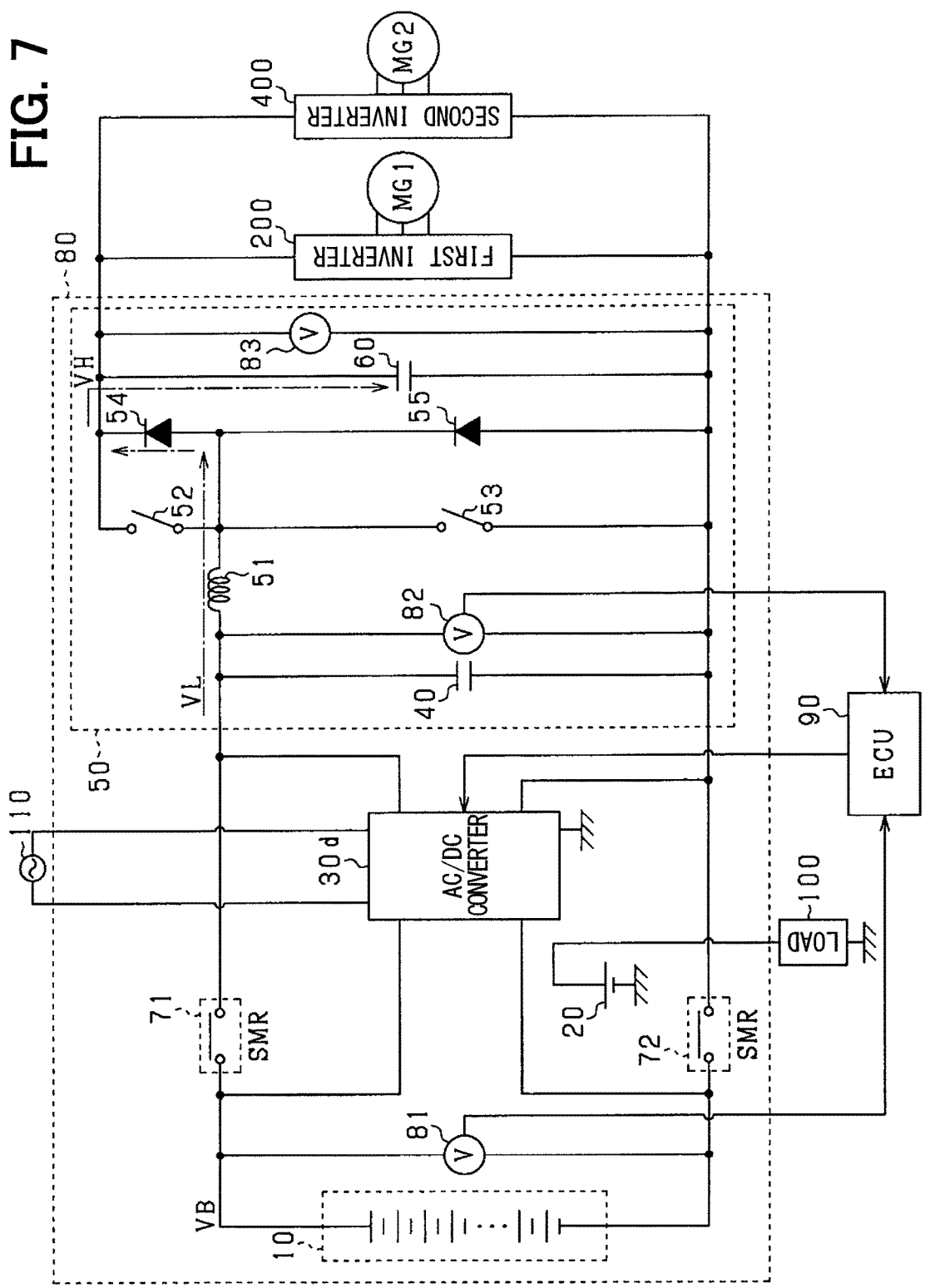
FIG. 7 is a diagram illustrating a power supply system according to a modification.

Specifically, as shown in FIG. 7, an AC-DC converter 30*d* may be employed as the voltage source, the AC-DC converter 30*d* being mounted to vehicle, converting AC power outputted from a commercially available AC power source 110 to DC power, and charging the main battery 10.

An AC-DC converter that is located out of the vehicle, that converts AC power outputted from a commercially available AC power source to DC power and that is connected to the power system of the vehicle to charge the main battery 10 may be employed as the voltage source.

An AC-DC converter that is mounted to vehicle, that converts AC power outputted from on-vehicle power generator (such as alternator or motor generator) to DC power, and that charges the main battery 10 may be employed as the voltage source. The on-vehicle power generator preferably executes power generation by receiving power from a motor or an engine driving the on-vehicle power generator.

A battery outputting voltage higher than the main battery 10 may be employed as the voltage source. The battery employed as the voltage source may be a secondary battery such as lithium-ion battery or a primary battery such as fuel battery.

Several above-described voltage sources may be assembled. That is, for example, both DC-DC converter 30 and DC-DC converter 30*a* may be provided.

In the above embodiment, the diode 54 of the step-up circuit 50 (more specifically, a diode 54 disposed at higher potential side among the diodes 54 and 55 employed for the step-up operation of the step-up circuit 50) is employed as the regulation element that does not regulate the current flowing from the SMR 71 toward the smooth capacitor 60 and that regulates the current flowing from the smooth capacitor 60 toward the SMR 71. However, the regulation element may be modified. For example, another diode may be added between the SMR 71 and the step-up circuit 50 (i.e., the coil 51), the diode having an anode connected to SMR 71 and a cathode connected to the coil 51.

A switch (more specifically, a MOS switch) may be employed instead of the diode. In the structure with the switch, for example, the switch is disposed between the SRM 71 and the step-up circuit 50 (i.e., a coil 51), the switch is controlled to be shifted to on-state when the voltage on a side of the SMR 71 is higher than the voltage of the step-up circuit 50 and the switch is controlled to be shifted to off-state when the voltage on the side of the SRM 71 is lower than the voltage of the step-up circuit 50. More specifically, the ECU 90 obtains the detection value of the current flowing in the switch and controls on/off of the switch based on the direction of the current flowing in the switch.

Figure 3:
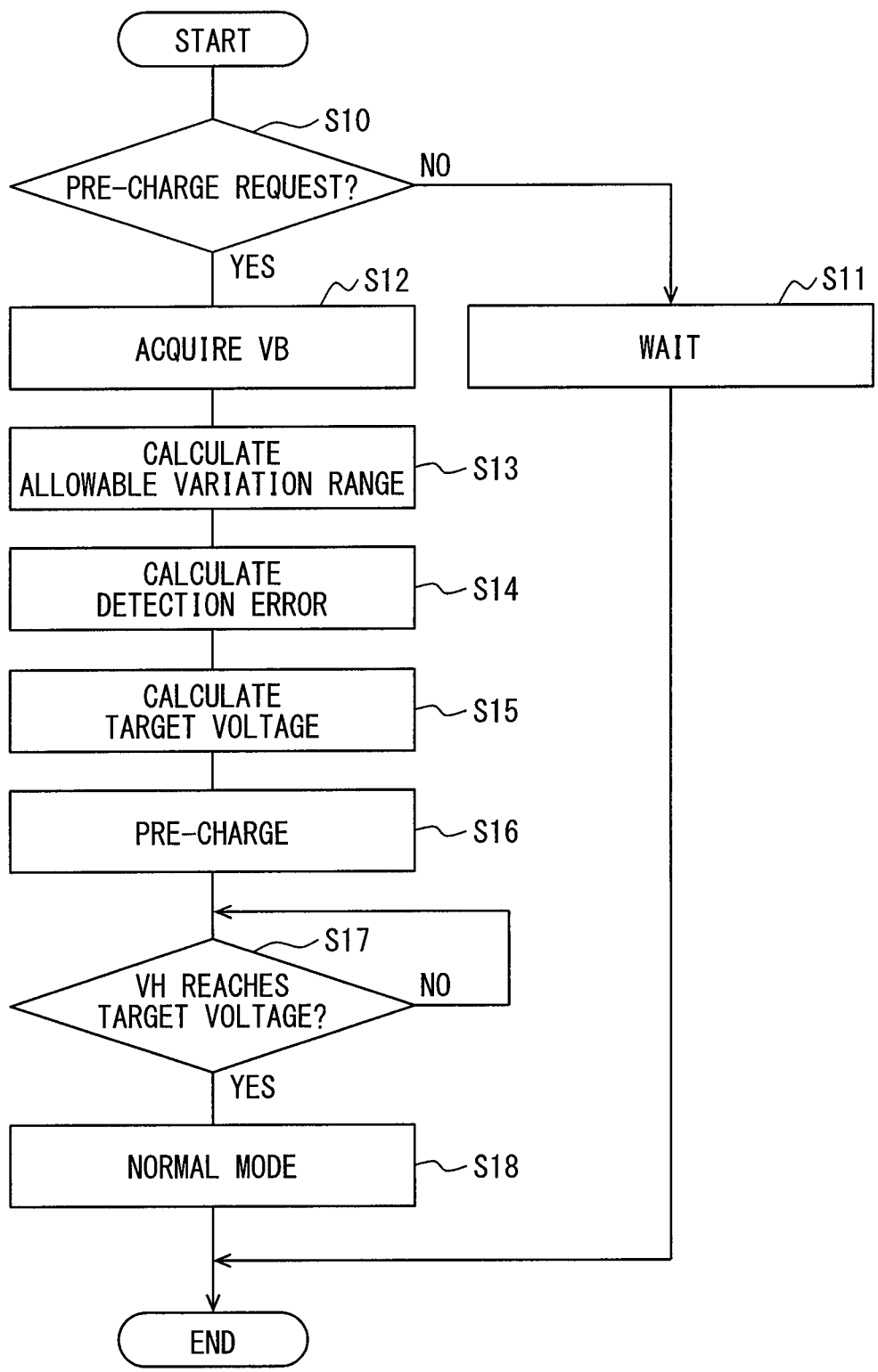
FIG. 3 is a flowchart illustrating a processing for executing pre-charge.

In the above embodiment, it is determined whether the detection voltage VHd of the voltage VH reaches the target voltage of the pre-charge and when the detection voltage VHd of the voltage VH reaches the target voltage, SMRs 71, 72 are shifted from the off-state to the on-state, and the pre-charge mode is shifted to the normal mode (i.e., S17, S18 of FIG. 3). However, the determination whether the detection voltage VHd of the voltage VH reaches the target voltage of the pre-charge may be omitted.

The DC-DC converter 30 outputs voltage higher than the main battery 10 before the SMRs 71, 72 are shifted from the disconnection state to the connection state. Therefore, for example, by supplying electric power from the DC-DC converter 30 to the smooth capacitor 60 for a predetermined time period, the inter-terminal voltage between the terminals of the smooth capacitor 60 are increased to be higher than the main battery 10. When the inter-terminal voltage of the smooth capacitor 60 is higher than the main battery 10, the diode 54, which is the regulation element, regulates the large current, which is caused by shifting the SMRs 71, 72 from the disconnection state to the connection state, from flowing from the smooth capacitor 60 to the main battery 10.

Two switching elements with built-in body diode (e.g., MOSFETs) may be connected in series with each other, instead of the switching elements 52, 53 and the diodes 54, 55. In this case, when the SMRs 71, 72 are shifted from the off-state to the on-state after the pre-charge, the MOSFET disposed on an upper arm is turned off. When the MOSFET disposed on the upper arm is controlled, the MOSFET on the upper arm functions as the regulation element, instead of the diode 54.

The electric charge of the filter capacitor 40 does not have to be discharged before the SMRs 71, 72 are shifted from the off-state to the on-state after the pre-charge. Even when the electric charge of the filter capacitor 40 is not discharged, the deviation ΔV is likely to be within the allowable variation range from −A2 to A1 by setting the target voltage of the pre-charge to be the value larger than the detection value of the voltage VB by the predetermined voltage ΔVS.

While only the selected exemplary embodiment and examples have been chosen to illustrate the present disclosure, it will be apparent to those skilled in the art from this disclosure that various changes and modifications can be made therein without departing from the scope of the disclosure as defined in the appended claims. Furthermore, the foregoing description of the exemplary embodiment and examples according to the present disclosure is provided for illustration only, and not for the purpose of limiting the disclosure as defined by the appended claims and their equivalents.

What is claimed is:

1. A control device for a power supply system, the power supply system including:
   a main electric storage device;
   a smooth capacitor;
   a step-up circuit that includes the smooth capacitor, increases a voltage on a side of the main electric storage device, and outputs the voltage being increased toward a side of the smooth capacitor;
   an open-close switch that electrically connects or disconnects between the main electric storage device and the step-up circuit;
   a voltage source that is connected to a connection portion between the open-close switch and the step-up circuit, and outputs an output voltage higher than a voltage of the main electric storage device before the open-close switch is shifted from a disconnection state to a connection state; and
   a regulation element that does not regulate a current flowing from the open-close switch toward the smooth capacitor, and regulates a current flowing from the smooth capacitor toward the open-close switch,
   the control device comprising:
   a pre-charge unit that executes a pre-charge of the smooth capacitor by supplying an electric power from the voltage source to the smooth capacitor before the open-close switch is shifted from the disconnection state to the connection state;
   a voltage set unit that sets a target voltage of the pre-charge of the smooth capacitor, the target voltage being equal to or lower than the output voltage of the voltage source and higher by a predetermined voltage than a detection voltage of the main electric storage device; and
   an energization unit that shifts the open-close switch to the connection state after a detection voltage of the smooth capacitor is determined to reach the target voltage.

2. The control device according to claim 1, wherein:
   a lower limit of a value in which the predetermined voltage, a detection error of the detection voltage of the main electric storage device and a detection error of the detection voltage of the smooth capacitor are added to the voltage of the main electric storage device is defined as a first lower limit;
   a lower limit of an allowable range of the smooth capacitor in which an allowable variation is added to the voltage of the main electric storage device is defined as a second lower limit; and
   the voltage set unit sets the predetermined voltage so that the first lower limit is higher than the second lower limit.

3. The control device according to claim 2, further comprising
   a voltage-error map showing the detection error of the detection voltage of the main electric storage device and the detection error of the detection voltage of the smooth capacitor according to the voltage of the main electric storage device or the voltage of the smooth capacitor, wherein
   the voltage set unit calculates the detection error of the main electric storage device and the detection error of the smooth capacitor based on the voltage-error map.

4. The control device according to claim 2, further comprising
   a voltage-allowance map showing the allowable variation according to the voltage of the main electric storage device or the voltage of the smooth capacitor, wherein
   the voltage set unit calculates the allowable variation based on the voltage-allowance map.

5. The control device according to claim 2, further comprising
   a temperature-allowance map showing the allowable variation according to a temperature under an usage environment of the power supply system, wherein
   the voltage set unit calculates the allowable variation based on the temperature-allowance map.

6. The control device according to claim 2, further comprising
   a temperature-error map showing the detection error of the detection voltage of the main electric storage device and the detection error of the detection voltage of the smooth capacitor according to a temperature under an usage environment of the power supply system, wherein the voltage set unit calculates the detection error of the main electric storage device and the detection error of the smooth capacitor based on the temperature-error map.

7. The control device according to claim 2, wherein the voltage set unit calculates the allowable variation based on a capacity of the smooth capacitor.

8. The control device according to claim 1, wherein the regulation element includes a diode disposed in the step-up circuit.

9. The control device according to claim 1, wherein the voltage source includes a power converter that receives an electric power from a predetermined power source and outputs an output voltage higher than the voltage of the main electric storage device before the open-close switch is shifted from the disconnection state to the connection state.

10. The control device according to claim 1, wherein:

the power supply system includes an auxiliary electric storage device that outputs an output voltage lower than the main electric storage device; and the voltage source includes a DC-DC converter that is connected between the connection portion and the auxiliary electric storage device, and converts and outputs the output voltage of the auxiliary electric storage device.

11. The control device according to claim 10, wherein the power supply system includes a filter capacitor that is disposed between the DC-DC converter and the step-up circuit, and is connected in parallel with the DC-DC converter, the control device further comprising:

a voltage set unit that sets a target voltage of the pre-charge of the smooth capacitor, the target voltage being equal to or lower than the output voltage of the voltage source and being higher by a predetermined voltage than a detection voltage of the main electric storage device;

an energization unit that shifts the open-close switch to the connection state after a detection voltage of the smooth capacitor is determined to reach the target voltage; and a discharge unit that discharges an electric power stored in the filter capacitor after the detection voltage of the smooth capacitor is determined to reach the target voltage.

12. The control device according to claim 11, wherein the discharge unit discharges the electric power stored in the filter capacitor by operating the DC-DC converter.

13. The control device according to claim 11, wherein the discharge unit discharges the electric power stored in the filter capacitor by operating the step-up circuit.

* * * * *